(12) United States Patent
Chen

(10) Patent No.: US 8,485,767 B2
(45) Date of Patent: Jul. 16, 2013

(54) CUTTER-TOOLING ASSEMBLY

(76) Inventor: Chin-Chiu Chen, Cingshuei Chen (TW)

( * ) Notice: Subject to any disclaimer, the term of this patent is extended or adjusted under 35 U.S.C. 154(b) by 417 days.

(21) Appl. No.: 12/940,767

(22) Filed: Nov. 5, 2010

(65) Prior Publication Data
US 2012/0114434 A1    May 10, 2012

(51) Int. Cl.
*B23B 31/117* (2006.01)

(52) U.S. Cl.
USPC .......... 409/234; 279/9.1; 408/226; 408/239 A

(58) Field of Classification Search
USPC .......... 408/226, 238, 239 A, 239 R; 409/234; 279/9.1
See application file for complete search history.

(56) References Cited

U.S. PATENT DOCUMENTS

| | | | | |
|---|---|---|---|---|
| 2,279,310 A * | 4/1942 | Grey | | 279/78 |
| 2,383,688 A * | 8/1945 | Donaldson | | 279/8 |
| 3,053,118 A * | 9/1962 | Lavallee | | 76/108.1 |
| 5,607,263 A * | 3/1997 | Nespeta et al. | | 407/61 |
| 6,339,868 B1 * | 1/2002 | Nagaya et al. | | 29/447 |
| 2003/0143044 A1 * | 7/2003 | Rothenstein | | 408/233 |
| 2005/0095076 A1 * | 5/2005 | Pantzar | | 409/234 |
| 2005/0238451 A1 * | 10/2005 | Hartman | | 409/234 |
| 2007/0059117 A1 * | 3/2007 | Haimer et al. | | 409/234 |
| 2008/0166198 A1 * | 7/2008 | Stojanovski | | 409/234 |

FOREIGN PATENT DOCUMENTS
JP     2003071644 A1 *  3/2003

* cited by examiner

*Primary Examiner* — Daniel Howell
*Assistant Examiner* — Ryan Rufo
(74) *Attorney, Agent, or Firm* — Hershkovitz & Associates, PLLC; Abraham Hershkovitz

(57) ABSTRACT

A cutter-tooling assembly has a tool holder and a cutter. The tool holder has an inserted section and a through hole axially formed through the inserted section. The through hole has a fixing segment. The fixing segment has an inner surface and multiple recesses formed around the inner surface of the fixing segment at intervals. The cutter is inserted into the through hole of the tool holder and has a fixing end. The fixing end has an outer surface and multiple corners formed on the outer surface of the fixing end and abutting the recesses. Because the fixing segment has the multiple recesses which the corners of the cutter abut, the combination of the recesses and the corners can prevent a relative rotation between the tool holder and the cutter and make the cutter securely connected with the tool holder.

1 Claim, 5 Drawing Sheets

CUTTER-TOOLING ASSEMBLY

BACKGROUND OF THE INVENTION

1. Field of the Invention

The present invention relates to a cutter-tooling assembly, and more particularly to a cutter-tooling assembly to prevent a relative rotation between a cutter and a tool holder.

2. Description of Related Art

With reference to FIG. 5, a conventional cutter-tooling assembly has a tool holder 70 and a cutter 80. The tool holder 70 has a through hole 71 axially formed through the tool holder 70. The cutter 80 is inserted into the through hole 71 and is connected securely with the tool holder 70 by means of thermal expansion and contraction. Accordingly, the assembling of the tool holder 70 and the cutter 80 is completed and the conventional cutter-tooling assembly is ready for further operation.

However, cross sectional shapes of the cutter 80 and the through hole 71 of the tool holder 70 are round, so a relative rotation between the tool holder 70 and the cutter 80 may still occur and the conventional cutter-tooling assembly needs to be improved.

To overcome the shortcomings, the present invention intends to provide a cutter-tooling assembly to obviate the aforementioned problems.

SUMMARY OF THE INVENTION

The main objective of the invention is to provide a cutter-tooling assembly to prevent a relative rotation between a cutter and a tool holder.

A cutter-tooling assembly has a tool holder and a cutter. The tool holder has an inserted section and a through hole axially formed through the inserted section. The through hole has a fixing segment. The fixing segment has an inner surface and multiple recesses formed in the inner surface of the fixing segment at intervals. The cutter is inserted into the through hole of the tool holder and has a fixing end. The fixing end has an outer surface and multiple corners formed on the outer surface of the fixing end and abutting the recesses. Because a cross section shape of the fixing segment is multilateral and has the multiple recesses which the corners of the cutter abut, the combination of the recesses and the corners can prevent a relative rotation between the tool holder and the cutter and make the cutter securely connected with the tool holder.

Other objects, advantages and novel features of the invention will become more apparent from the following detailed description when taken in conjunction with the accompanying drawings.

DETAILED DESCRIPTION OF PREFERRED EMBODIMENT

Figure 1:
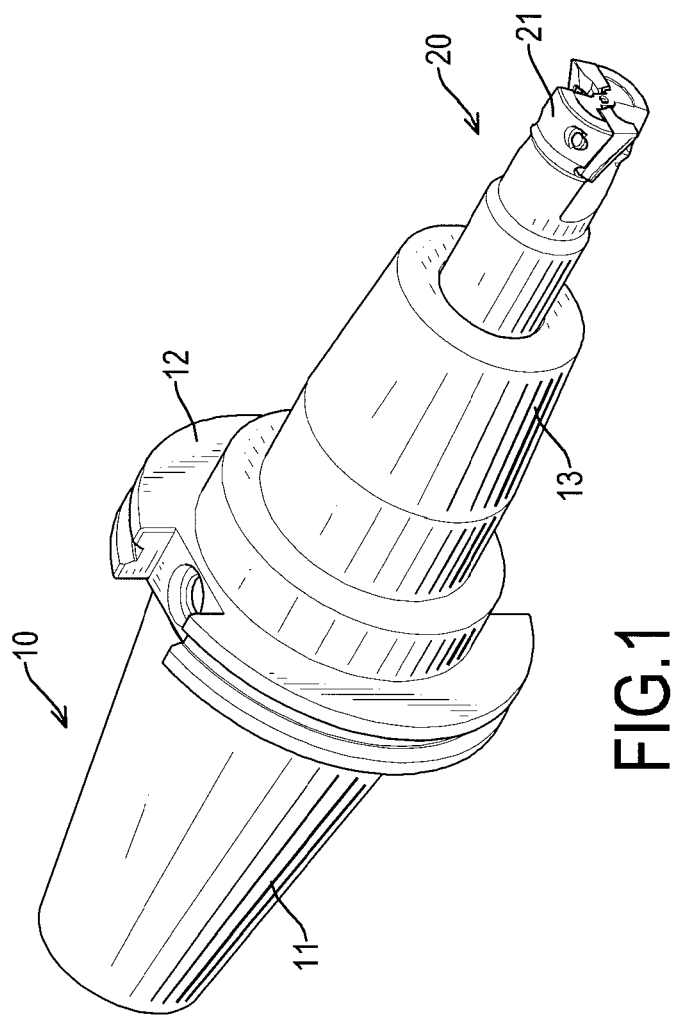
FIG. 1 is a perspective view of a first embodiment of a cutter-tooling assembly in accordance with the present invention.
Figure 2:
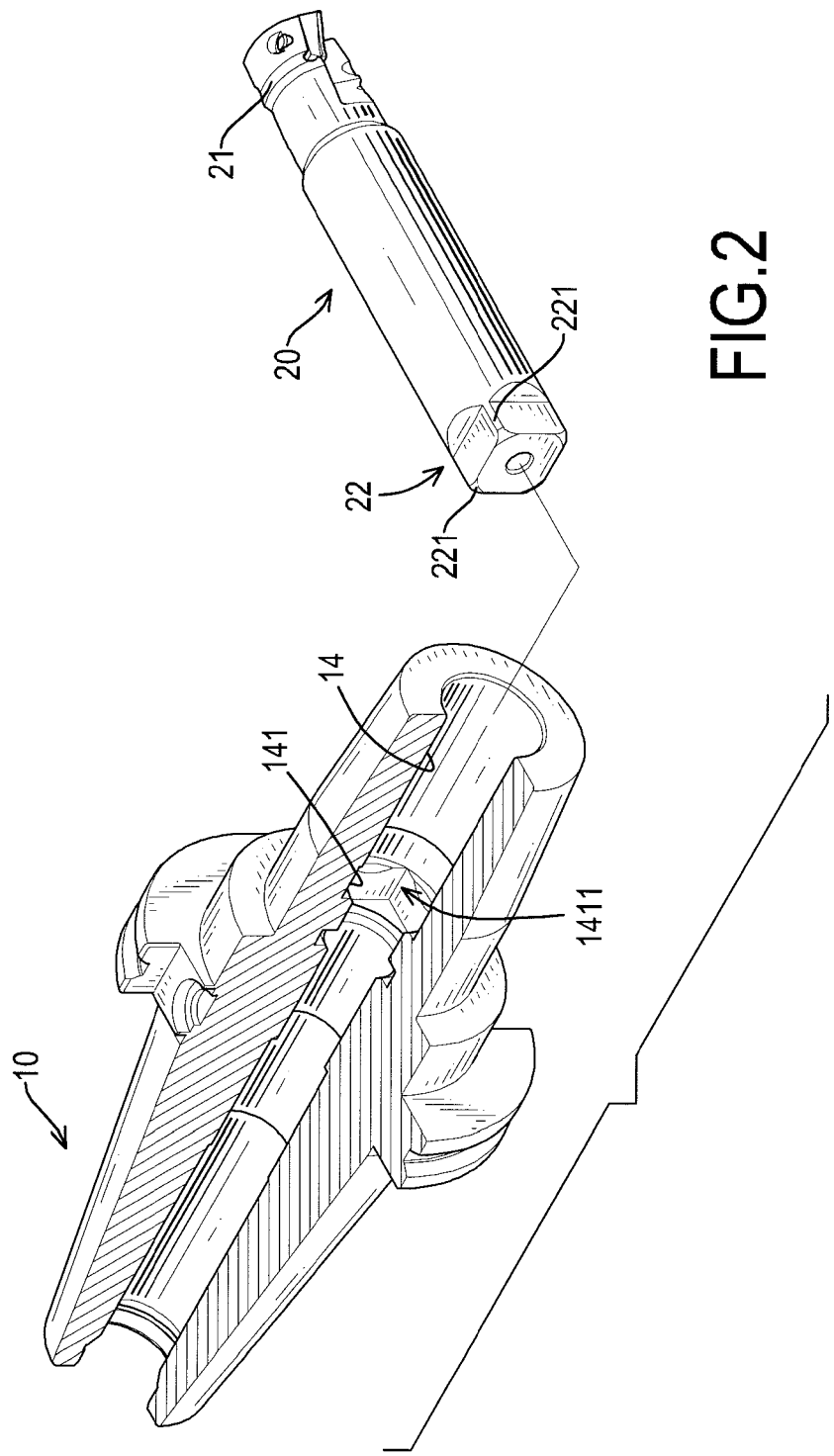
FIG. 2 is an exploded perspective view of the cutter-tooling assembly in FIG. 1.
Figure 3:
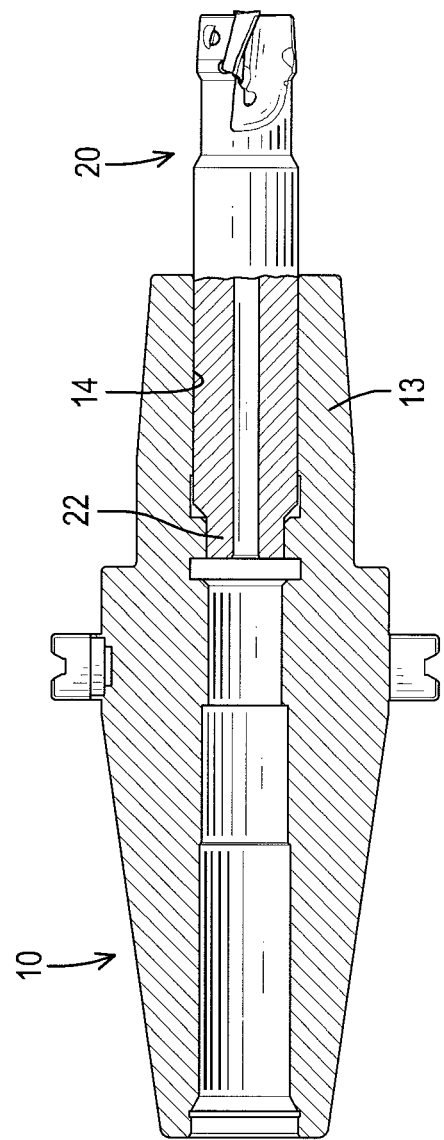
FIG. 3 is a side view in partial section of the cutter-tooling assembly in FIG. 1.

With reference to FIGS. 1 to 3, a first embodiment of a cutter-tooling assembly in accordance with the present invention comprises a tool holder 10 and a cutter 20.

The tool holder 10 is cylindrical and has a connecting section 11, a flange section 12, an inserted section 13 and a through hole 14. The connecting section 11 is conical and has an outer surface and an end surface. The flange section 12 is annular and is formed around the outer surface of the connecting section 11. The inserted section 13 is mounted securely with the end surface of the connecting section 11. The through hole 14 is axially formed through the connecting section 11 and the inserted section 13 and has a fixing segment 141. The fixing segment 141 is located at the inserted section 13 and has an inner surface and multiple recesses 1411. The recesses 1411 are formed around the inner surface of the fixing segment 141 at intervals to make the cross section of the fixing segment 141 non-circular.

The cutter 20 is an elongated rod, is inserted into the through hole 14 of the tool holder 10, is connected securely with the tool holder 10 by means of thermal expansion and contraction and has a cutting end 21, a fixing end 22 and a central segment. The fixing end 22 is opposite to the cutting end 21 of the cutter 20 and has a maximal diameter, an outer surface and multiple corners 221. The corners 221 are formed on the outer surface of the fixing end 22 and abut the recesses 1411. The central segment of the cutter 20 is formed between the cutting end 21 and the fixing end 22 of the cutter 20 and has a diameter. The diameter of the central segment of the cutter 20 is larger than or equal to the maximal diameter of the fixing end 22. Accordingly, the fixing end 22 and the central segment of the cutter 20 can be inserted into the through hole 14 of the tool holder 10. When the maximal diameter of the fixing end 22 is larger than the diameter of the central segment of the cutter 20, the fixing end 22 is kept from being inserted into the through hole 14 of the tool holder 10.

Preferably, the fixing end 22 has a cross sectional shape the same as that of the fixing segment 141. The corners 221 respectively abut the recesses 1411.

Preferably, the cross sectional shape of the fixing end 22 is rectangular and four corners 221 are correspondingly implemented.

Figure 4:
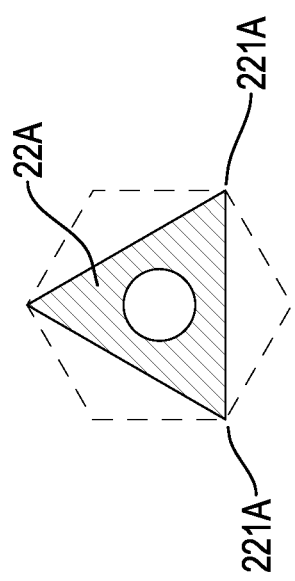
FIG. 4 is a cross sectional view of a tool holder and a cutter of a second embodiment of the cutter-tooling assembly in accordance with the present invention.
Figure 5:
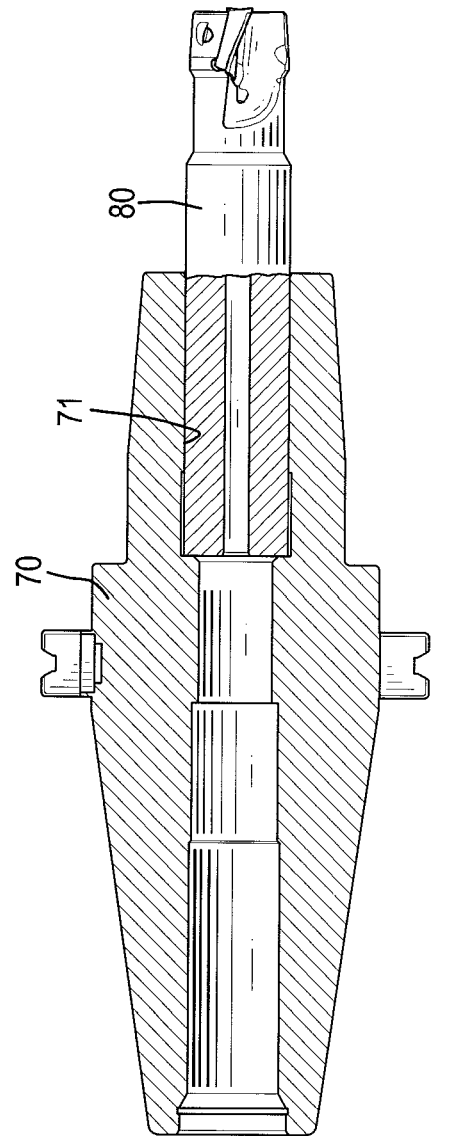
FIG. 5 is a side view in partial section of a conventional cutter-tooling assembly in accordance with the prior art.

Alternatively, the cross sectional shape of the fixing segment 141 may be different from that of the fixing end 22. For example, the cross sectional shape of the fixing segment 141 is hexagonal and the cross sectional shape of the fixing end 22 is triangular, as shown in FIG. 4. With further reference to FIG. 4, a second embodiment of the cutter-tooling assembly is substantially the same as the first embodiment except that the cross sectional shape of the fixing end 22A is triangular and three corners 221A are correspondingly implemented. Therefore, three corners 221A of the fixing end 22A abut three of the recesses 1411 of the fixing segment 141 to prevent a relative rotation between the cutter 20 and the tool holder 10. The present invention does not limit the cross sectional shapes of the fixing ends 22, 22A and the fixing segment 141.

From the above description, it is noted that the present invention has the following advantage: the cross sectional shape of the fixing segment 141 of the tool holder 10 is multilateral and has multiple recesses 1411 which the corners 221,221A of the cutter 20 abut, so the combination of the recesses 1411 and the corners 221,221A can prevent a relative rotation between the tool holder 10 and the cutter 20 and make the cutter 20 securely connected with the tool holder 10.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutter-tooling assembly comprising:
   a cylindrical tool holder having
      a connecting section having an outer surface and an end surface;
      a flange section formed on the outer surface of the connecting section;
      an inserted section mounted securely with the end surface of the connecting section; and
      a through hole axially formed through the connecting section and the inserted section and having
         a fixing segment being hexagonal in a cross sectional shape, located at the inserted section and having an inner surface; and
         six recesses formed around the inner surface of the fixing segment at intervals; and
   a cutter inserted into the through hole of the tool holder and having
      a cutting end;
      a fixing end opposite to the cutting end of the cutter, said fixing end being triangular in a cross sectional shape and having
         a maximal diameter;
         an outer surface; and
         three corners which are formed on the outer surface of the fixing end and abut three of the recesses; and
      a central segment formed between the cutting end and the fixing end of the cutter and having a diameter being larger than or equal to the maximal diameter of the fixing end.

\* \* \* \* \*